(12) United States Patent
Tob

(10) Patent No.: US 11,866,358 B2
(45) Date of Patent: Jan. 9, 2024

(54) METHOD AND DOMESTIC APPLIANCE FOR PRODUCING MINERAL WATER FROM TAP WATER

(71) Applicant: AQVITA SRL., Uccle (BE)

(72) Inventor: Philippe Tob, Uccle (BE)

(73) Assignee: AQVITA SRL., Uccle (BE)

( * ) Notice: Subject to any disclaimer, the term of this patent is extended or adjusted under 35 U.S.C. 154(b) by 0 days.

(21) Appl. No.: 16/634,711

(22) PCT Filed: Mar. 28, 2018

(86) PCT No.: PCT/EP2018/057868
§ 371 (c)(1),
(2) Date: Jan. 28, 2020

(87) PCT Pub. No.: WO2019/020221
PCT Pub. Date: Jan. 31, 2019

(65) Prior Publication Data
US 2020/0207651 A1 Jul. 2, 2020

(30) Foreign Application Priority Data
Jul. 28, 2017 (BE) .................................. 2017/5533

(51) Int. Cl.
*C02F 9/00* (2023.01)
*C02F 9/20* (2023.01)
(Continued)

(52) U.S. Cl.
CPC ................ *C02F 9/20* (2023.01); *C02F 1/283* (2013.01); *C02F 1/42* (2013.01); *C02F 1/441* (2013.01); *C02F 1/66* (2013.01); *C02F 1/68* (2013.01)

(58) Field of Classification Search
CPC .. C02F 1/283; C02F 1/42; C02F 1/441; C02F 1/444; C02F 1/66; C02F 1/68; C02F 9/005
See application file for complete search history.

(56) References Cited

U.S. PATENT DOCUMENTS

2005/0006289 A1* 1/2005 Biesheuvel .......... B67D 1/0009
210/194
2007/0170212 A1* 7/2007 Biesheuvel ............. G01F 11/22
222/333
(Continued)

FOREIGN PATENT DOCUMENTS

EP 3034474 6/2016
NL 1019544 12/2001
(Continued)

OTHER PUBLICATIONS

Brečević, L. and Kralj, D. (2007; on calcium carbonates: from fundamental research to application) Croatica Chemica Acta, 80(3-4), 467-484).
(Continued)

*Primary Examiner* — Dirk R Bass
(74) *Attorney, Agent, or Firm* — Maschoff Brennan

(57) ABSTRACT

The invention relates to a household appliance for the implementation of a method enabling the instant production of mineral water with a selected composition and flavour, upon request, from tap water. The tap water circulates through a filtering unit, a demineralisation unit and a remineralisation unit comprising at least one secondary input, connected to a fluidic microfeeding device, downstream from which a portion of the circuit is a static mixer. An inlet valve and the outlet valve are arranged to operate in parallel and simultaneously.

4 Claims, 4 Drawing Sheets

(51) Int. Cl.
  *C02F 1/28* (2023.01)
  *C02F 1/42* (2023.01)
  *C02F 1/44* (2023.01)
  *C02F 1/66* (2023.01)
  *C02F 1/68* (2023.01)

(56) References Cited

U.S. PATENT DOCUMENTS

2009/0242485 A1  10/2009  Cabados
2017/0341942 A1* 11/2017  Harper, Jr. ............... F01K 7/16
2018/0168164 A1*  6/2018  Payton .................... C02F 1/505

FOREIGN PATENT DOCUMENTS

| WO | 1998/041218 | 9/1998 |
| WO | 2004/103097 | 12/2004 |
| WO | 2012/038986 | 3/2012 |
| WO | 2014/093049 | 6/2014 |
| WO | 2017174458 | 10/2017 |

OTHER PUBLICATIONS

Lu, Xuesong, Shoufeng Yang, and Julian RG Evans. "Microfeeding with different ultrasonic nozzle designs." Ultrasonics 49.6-7 (2009): 514-521.

Lu, Xuesong, et al. "Dry powder microfeeding system for solid freeform fabrication." Austin, TX (2006): 636-643.

Yang, S., and J. R. G. Evans. "Metering and dispensing of powder; the quest for new solid freeforming techniques." Powder Technology 178.1 (2007): 56-72.

* cited by examiner

METHOD AND DOMESTIC APPLIANCE FOR PRODUCING MINERAL WATER FROM TAP WATER

CROSS-REFERENCE TO RELATED PATENT APPLICATIONS

This is a U.S. National Phase Application under 35 U.S.C. § 371 of International Patent Application No. PCT/EP2018/057868, filed Mar. 28, 2018, and claims priority to Belgian Patent Application No. BE2017/5533, filed Jul. 28, 2017, which is incorporated by reference in its entirety. The International Application was published on Jan. 31, 2019, as International Publication No. WO 2019/020221 A1.

The invention relates to the field of the household production of mineral water, either still or sparkling.

In particular, each home, and each building intended for people, either for professional purposes or for private purposes, is connected to a water distribution network whereby it is supplied in running water, also called municipal water, mains water or tap water. Generally, in many countries, this tap water is drinkable, i.e. it is suitable for human consumption without presenting any health hazards.

However, the taste of this water is generally poor. An unpleasant note of chlorine, stemming from disinfection treatments, can often be tasted in the water. This taste is bothersome not only when the water is drunk directly, but also persists in concoctions wherein the water is used, such a tea or coffee for instance.

To remedy this problem, consumers often buy bottles of spring water or natural mineral water that have a taste and a flavour they prefer. It is indeed a well-known fact that each mineral water has a unique taste that depends on the ratios of the different minerals it contains. However, the recommended daily water consumption being of one and a half litres per person, the volume to carry home from the shop can be a real burden.

To avoid having to buy significant volumes of water, many households resort to filtering jugs to improve the taste of tap water. This type of jug is designed so that a volume of water collected at the tap is, under the effect of gravity, passed through a filter cartridge, generally containing activated carbon. The water thus filtered is generally rid of its bad taste, but also of the majority of its minerals. The filter cartridge has a limited lifecycle and has to be replaced frequently, generally every month. The taste and mineral quality of the water filtered in this type of jug do not remain constant throughout the lifecycle of the cartridge, depending on whether the cartridge is new or nearing the end of its lifecycle. Furthermore, the water thus filtered is not immediately available. Because of the configuration of the jug, it is necessary to wait for the entire volume of collected water to be filtered before pouring a glass, otherwise the non-filtered portion of the water leaks out of the jug.

More perfected systems are also available, generally for use in corporate settings. An appliance, comprising a filter cartridge, is connected to the water mains. Generally, this appliance is equipped with a pump, to ensure a flow rate of water that is not solely dependent on gravity, a cooling unit, to provide cool water along with water at ambient temperature, and possibly a gas cartridge to also provide sparkling water. The filter cartridge has, in this case too, a limited lifecycle, and the harder or more chlorinated the tap water, the faster the filter cartridge is worn out.

A more perfected system, described in patent applications NL1019544 and WO2004/103097, enables to reconstitute specific mineral water by adding, in a reservoir, a concentrated mother solution of minerals to a given volume of purified tap water. This system also comprises at least one other reservoir wherein the mixture is stored before its use. The possibility of bacteria and/or algae or solid mineral particles developing in the reservoirs over the course of the storage period is eliminated by a system whereby the water recirculates through a filter to achieve, at any given moment, water with a determined quality. However, because of the presence of reservoirs, the system is cumbersome and requires a lot of power to recirculate the produced mineral water between the reservoirs. Furthermore, the mineral elements used here are mainly chlorides and sulphates, as they are easy to dissolve, which are not optimal in terms of flavour. Chlorides and sulphates are used at the expense of carbonates that are naturally present in mineral waters available on the market, and that would be preferable in terms of digestion and taste.

It has therefore been deemed necessary by the applicant to develop a method as well as a household appliance enabling the immediate production, upon request, of mineral water with a selected composition and taste.

Solution According to the Invention

For this purpose, the present invention proposes a method for the immediate production of mineral water, with a predefined content of mineral elements, from tap water, having a known inadequate content of mineral elements and a known pH, and comprising impurities, said method comprising the following steps:
- the impurities of the tap water are eliminated to obtain purified water;
- the purified water is at least partially demineralised by selective removal of the minerals;
- the demineralised water is then remineralised by injection of a predetermined volume of a concentrated solution, of a synthetic powder and/or of aragonite comprising at least one mineral element that is lacking to readjust the content to said predefined content;
- the remineralised water is collected; and
- the production of mineral water is stopped;

method characterised in that
- a determined quantity of water is continuously circulated, and
- said predetermined volume is regularly injected until the water stops flowing.

The impurities in question here can be soluble impurities, for example trace amounts of organic micro-pollutants such as pesticides, hydrocarbons, or trace amounts of heavy metals such as cadmium or lead.

The impurities can also be insoluble, such as for example residue amounts of micro-organisms, precipitated heavy metals or mineral aggregates.

The remineralisation of the remineralised water can also comprise a step whereby the water passes on a mineral and/or ion-exchange resin column. The "term mineral column" is used to describe a filter or a cartridge comprising solid salts forming a network and that dissolve partially when water runs through said network. Advantageously, the mineral column comprises elements that have low solubility in water and that are hard to dissolve in sufficient quantities in the concentrated solution or solutions. These elements with low solubility are generally calcium and magnesium in a carbonate form. The column can for example contain dolomite, which is a mixed calcium and magnesium carbonate, or calcite, which comprises primarily calcium carbonate.

The term "powder comprising at least one lacking mineral element" is here used to describe a synthetic powder or micronized aragonite. The powders are very fine powders, made of particles with diameters of a few microns, for example between 5 and 200 microns, that feature significant fluidity and of which the volume can be measured, in a manner very similar to that used for liquid solutions.

Aragonite is the polymorphic form, stable at high temperature and at high pressure, of calcium carbonate, the two other stable polymorphs under ambient conditions being calcite and vaterite. Marine oolitic aragonite is, in particular, found in the Bahamas and in Florida.

The term "synthetic powders" is used to describe specific mineral salts, such as calcium carbonate for example, obtained by precipitation in specific conditions that give specific dimensions and properties to the particles. For example, the article by Brečević, L. and Kralj, D. (2007; *on calcium carbonates: from fundamental research to application. Croatica Chemica Acta*, 80(3-4), 467-484) reviews the techniques enabling to obtain polymorphic forms of calcium carbonate. This article describes in particular the formation of amorphous calcium carbonate, less stable than the crystalline forms (calcite, vaterite) or hydrated forms, but with a higher dissolution rate and that can advantageously be used for the implementation of the method according to the invention. Aragonite can also be obtained by a synthetic process. Synthetic powders of calcium carbonate, of magnesium carbonate, of calcium hydroxide or of magnesium hydroxide can for example be used, or a mixture thereof, preferably at least partially in an amorphous form.

Mesoporous synthetic powders, such as those described in application WO2017174458, can also advantageously be used for the implementation of the invention. Indeed, these powders being largely amorphous, they feature interesting dissolution properties.

Synthetic powders are therefore not micronized or ground powders such as those that can be found in industrial remineralisation systems, but powders of mineral salts, at least partially amorphous.

Synthetic powders have the advantage of being even more concentrated than concentrated solutions and of requiring smaller cartridges. The dosage of small quantities of powder, i.e. a few microliters, is possible for example with technologies developed for laser or 3D printing, whereby layers of powder are deposited. The person skilled in the art can nonetheless use any other suitable technology for the dosage of fine powders.

Synthetic mineral powders and aragonite, in particular amorphous powders, because in particular of their morphology, the size of their particles and/or their degree of hydration, feature dissolution rates that are much faster than crystalline forms available on the market, such as calcite. They enable near-immediate dissolution. The terms "regularly" or "regular injection" are here used to describe the fact that a few microliters or millilitres of the concentrated solution, of the synthetic powder and/or of aragonite are injected at a frequency determined by the flow of the water that is to be remineralised. The injected volume is determined so as to obtain an efficient mixing with the demineralised water, in order to ensure the homogeneity of the mineral concentrations over time, at the output of the method.

In some cases, the pH of tap water being very different from the pH of the mineral water that is to be produced, the pH of the remineralised water must be adjusted.

In some cases, it is also necessary to adjust the pH of the demineralised water prior to remineralisation in order to optimise the dilution of the concentrated solution in the demineralised water and, as necessary, the elements of the mineral column.

The pH adjustment can be by acidification or basification. Acidification can for example be achieved by the injection of a volume of an acid solution or by injection of carbon dioxide, prior to remineralisation. Basification can for example be achieved by adding a volume of a basic solution.

To prepare a sparkling mineral water (fizzy water or carbonated water), carbon dioxide is injected, preferably after remineralisation.

The method for producing mineral water according to the invention is preferably for use in a household, and not for industrial use. The quantity of mineral water to produce remains limited to the consumption of one household, or one company. It enables to produce, instantaneously, a clear mineral water, having the taste the user has selected, said taste resulting from a specific composition.

The term "instantaneously" is used to mean immediately, in the seconds that follow. The method differs from methods whereby an internal reservoir is first filled in order to prepare a mixture with a concentrated mineral solution, before being able to retrieve mineral water. It also differs from methods involving minerals in the form of solid salts, the dissolution of which can take several minutes or hours before obtaining a clear mineral water. The method according to the invention enables to obtain a clear mineral water in a few seconds, with salts featuring a specific morphology and a size of 5 to 200 microns; it also enables to use a system for the microfeeding of powder and/or to use systems for the microfeeding of concentrated mineral solutions through regular injections.

The present invention also proposes an appliance for implementing the method according to the invention. The invention consists of a household appliance comprising a circuit for the circulation of water circuit from an input to at least one output, said input being provided with an inlet valve connected to the water mains, and said output being provided with an outlet valve, said circuit passing successively through a filtering unit, a demineralisation unit and a remineralisation unit, appliance characterised in that said remineralisation unit comprises at least one secondary input, connected to a fluidic microfeeding device, downstream from which a portion of the circuit is a static mixer, and said inlet valve and outlet valve are arranged to operate in parallel and simultaneously.

The term "operate in parallel" is used to describe the fact that when one of the valves is open, the other is open too in order not to allow water to accumulate in the circuit. This characteristic differs from systems wherein the demineralised water is first accumulated in an internal reservoir, where it is mixed with a concentrated mineral solution.

The term "household" implies that the appliance is not adapted for an industrial production and that it features production capacities and dimensions enabling it to be installed in a home or in a place of work in order to provide a limited number of persons with a source of mineral water. The appliance can be adapted for HoReCa or be installed in a public space.

Advantageously, the static mixer is a helical insert, creating turbulence in the water circulating therein in order to optimise the mixture of the demineralised water, of the carbon dioxide if present, and of the volume of added minerals.

Also advantageously, the fluidic microfeeding device is a pump or microfeeding valve or a device for the microfeeding of micronized powder, as for example an ultrasonic system comprising a feeding nozzle with a diameter ranging from 100 to 400 microns, or a system similar to those used in 3D printing, such as described by X Lu, S Yang and JRG Evans (*Microfeeding with different ultrasonic nozzle designs;*—Ultrasonics, 2009; *Dry powder microfeeding system for solid freeform fabrication: Solid Freeform Fabrication* Symposium, Austin, TX, 2006; *Metering and dispensing of powder: the quest for new solid freeforming techniques*, Powder Technology, 178(1), 56-72. DOI: 10.1016/j.powtec.2007.04.004).

In certain cases, to limit the precipitation risk of mineral elements during mixing, it is preferable to install a series of several secondary inputs, each connected to a fluidic microfeeding device, in order to achieve a sequential mixing of the minerals.

The fluidic microfeeding device dispenses micro-volumes of the concentrated solution or of powders, depending on the flow rate of the water passing through the remineralisation unit. The frequency at which the concentrated solution or the powders are dispensed, as well as the dispensed volume are predetermined based on the circulation flow rate of the water to be remineralised, in order to optimise the efficiency of the helical insert and to obtain, at the system output, a substantially constant concentration over time.

The remineralisation unit can also comprise a mineral and/or ion-exchange resin column.

The term "sequential mixing" is used to describe the fact that a first micro-volume of a solution concentrated in certain mineral elements is injected in demineralised water to obtain a partially remineralised water, then a second micro-volume of a second solution concentrated in mineral elements is added, and possibly a third micro-volume, etc. Each concentrated solution can have a different composition, i.e. contain different mineral elements, or contain the same elements but at different concentrations. The content of these concentrated solutions is adjusted based on the compatibility of these various mineral elements, in terms of solubility.

The use of solutions concentrated in mineral elements, rather than the injection of solid salts, eliminates the time required to dissolve such solid salts, which would go against the immediacy of the method. However, the use of certain forms of synthetic powders enables near-instant dissolution. The injection of concentrated solutions, of synthetic powders or of aragonite can be complemented by, or combined with one or several columns of mineral salts and/or one or several ion-exchange resins enabling the optimisation of the remineralisation sequence.

The invention will be better understood upon reading the following description of several embodiments of the invention, with reference to the appended drawings, wherein.

Figure 1:
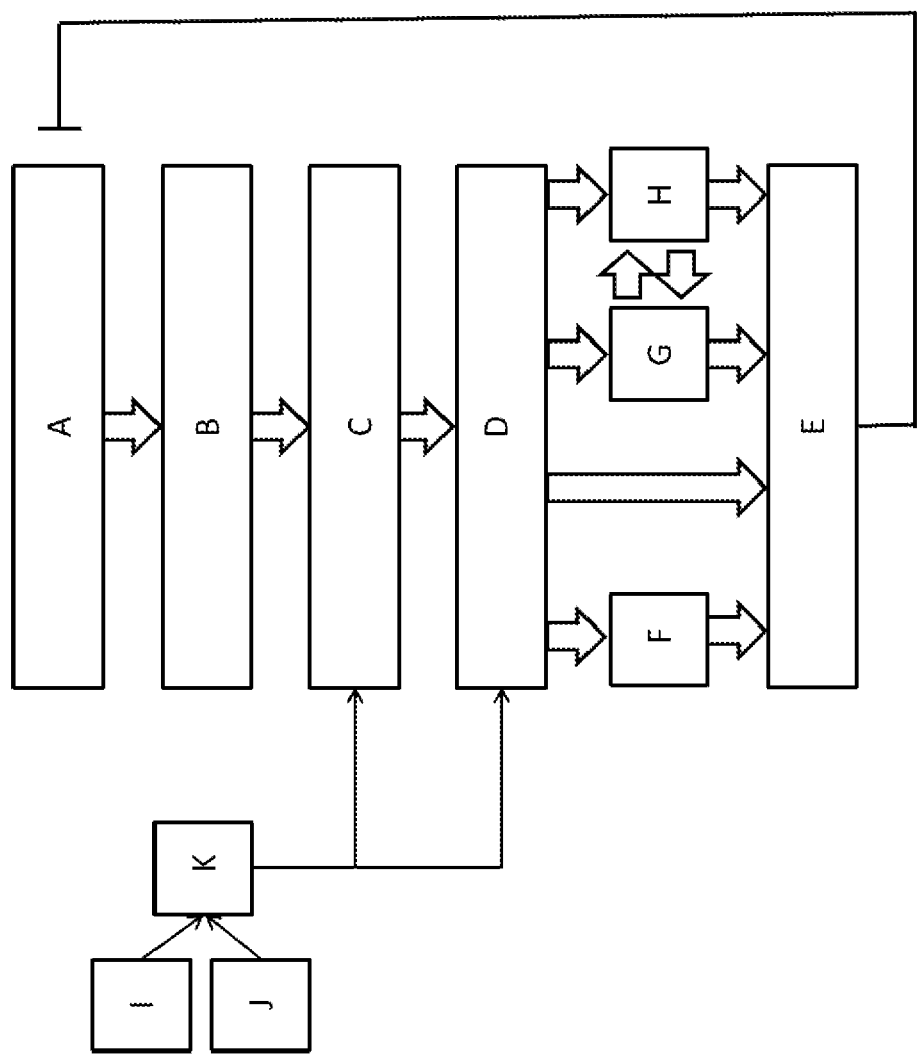
FIG. 1 is a block diagram of the method according to the invention.

With reference to FIG. 1, the method for the instant production of mineral water, having a content of mineral elements that is predefined for a consumer, from tap water, having a known content of mineral elements and a known pH, and comprising impurities, the tap water comprising mineral elements in inadequate proportions, comprises several steps.

During a first step A, a consumer manifests their desire for mineral water, thereby triggering the production process.

During a step B, the impurities of the tap water are eliminated to obtain purified water. The specific techniques of the purification step depend on the quality of the tap water. The purpose of the purification step is to eliminate suspended elements, residual chlorine and other components, such as heavy metals.

During a step C, the purified water is demineralised by partial or total removal of the minerals, in order to eliminate the undesirable components that were not eliminated during the purification step. These components are mainly monovalent and bivalent ions. The demineralisation step can implement a reverse osmosis technique, which tends to eliminate the totality of the minerals, or ion-exchange resins, which enable a selective demineralisation. The choice of technique is made on the basis of the compositions of the tap water and of the mineral water to be produced.

During a step D, the demineralised water is then remineralised by injection of a predetermined volume of a concentrated solution or of a volume of a synthetic powder or of aragonite comprising at least one mineral element that is lacking to readjust the content to said predefined content. This volume can be divided into several volumes of concentrated solutions and/or of powders having different mineral compositions or different concentrations, which are added at successive locations within the circuit, regardless of the fact that these volumes are injected regularly or at a predetermined frequency.

The water can also run on one or several mineral columns and/or ion-exchange resins, this passage causing the dissolution of solid minerals of the column and/or the exchange of ions with the resin, for the purpose of completing the remineralisation step.

In certain cases, carbon dioxide in a gaseous form can be injected into the circuit between step C and step D, for pH regulation purposes. This step might be necessary to facilitate the dissolution of the minerals at step D or to substantially acidify the demineralised water, when the pH of the mineral water to be produced is relatively acid and the carbonate ions cannot be only transported by dissolved species in the concentrated mineral solution.

During step E, the consumer retrieves the remineralised water they need, for example for personal consumption, or to fill a carafe. When the consumer has retrieved the required quantity of water, the mineral water production method ends, i.e. tap water stops being supplied at the filtration step. This implies that there is no accumulation of water during the production process. All the steps occur "in-line", i.e. water is continuously circulating. The remineralisation must therefore be immediate.

Several optional steps are also inserted between the remineralisation step D and the retrieval step E.

In the case of the mineral water to be produced being sparking water, a gasification step H is introduced after remineralisation.

The consumer can choose to retrieve hot water, lukewarm water, i.e. at ambient temperature, or cold water. A heating step F or a cooling step G can be performed. The cooling step G can possibly be implemented before or after the gasification step H.

These steps A to H are implemented each time a consumer wishes to retrieve remineralised water.

A certain number of preliminary steps must be completed to enable the required production of mineral water.

The consumer, during a step I, must on the one hand define the mineral water they want to produce at home, i.e. its flavour and mineral content. They can look to natural mineral waters available on the market for inspiration.

On the other hand, during a step J, the mineral content and the pH of the tap water dispensed in the facilities where the mineral water is to be produced must be analysed. Generally, this information is available, as mandatory analyses are regularly conducted.

The predefined content and tap water content are then compared during a step K in order to determine which minerals are present in excessive quantities and need to be eliminated, and which minerals are lacking and need to be added. Based on this determination, a partial or total demineralisation method is determined for step C, along with the nature and concentration of the mineral elements that are to be added during remineralisation step D.

Similarly, comparing the pH of the required mineral water with the pH of the tap water enables to determine the required pH adjustment.

For example, table 1 details the composition of the tap water dispensed in the *commune* of Uccle and compares it with the water sold under the registered trademark Evian.

TABLE 1

| Mineral element | Uccle tap water (ppm) | Evian (ppm) | difference |
|---|---|---|---|
| $Ca^{2+}$ | 6.6 | 78 | 71.4 |
| $Mg^{2+}$ | 5.2 | 24 | 18.8 |
| $Na^+$ | 25.9 | 5 | −20.9 |
| $K^+$ | 3.1 | 1 | −2.1 |
| $HCO_3^-$ | 175.3 | 357 | 181.7 |
| $SO_4^{2-}$ | 65.8 | 10 | −55.8 |
| $Cl^-$ | 18.9 | 4.5 | −14.4 |
| $NO_3^-$ | 12.0 | 3.8 | −8.2 |
| Total dissolved matter | 400 | 357 | |
| pH | 7.98 | 7.2 | |

The comparison reveals that the tap water contains an excess of sodium ($Na^+$), potassium ($K^+$), sulphate ($SO_4^{2-}$), chloride ($Cl^-$) and nitrate ($NO_3^-$) ions and a deficiency of calcium ($Ca^{2+}$), magnesium ($Mg^{2+}$) and bicarbonate ($HCO_3^-$) ions. The bicarbonate difference is partially responsible for the pH difference between these two waters.

To produce mineral water that is substantially similar to Evian water from Uccle tap water, it is possible to conduct a demineralisation process by reverse osmosis. 99.5% of the ions contained in the tap water of Uccle were thus eliminated. In this case the demineralisation is nearly total.

To remineralise adequately the water that has undergone osmosis, the composition of the concentrated solution in terms of mineral elements is then calculated. The mineral elements being inaccessible in the pure ionic form, it is important to correctly select salts or anion-cation pairs.

The concentrated solution of mineral ions is then prepared in two phases.

During a first phase, seven "monosaline" solutions are prepared, each of which contains a single salt dissolved at a concentration that is lower than its saturation concentration. Table 2 details the characteristics of each salt used, and the concentration of the prepared "monosaline" solutions.

TABLE 2

| Solution | Salt | Maximum solubility (g/100 mL) | Concentration (g/100 mL) |
|---|---|---|---|
| 1 | Ca(HCO3)2 | 16.1 at 0° C. and 16.6 at 20° C. | 10 |
| 2 | Mg(HCO3)2 | 2.0-3.1 [1] | 2 |
| 3 | NaHCO3 | 6.9 at 0° C. and 9.6 at 20° C. | 5 |
| 4 | KHCO3 | 33.7 at (20° C.) | 20 |
| 5 | NaCl | 35.9 | 20 |
| 6 | Ca(NO3)2•4H2O | 129.0 at 20° C. | 50 |
| 7 | MgSO4•7H2O | 26.9 at 0° C. and 35.1 at 20° C. | 10 |

The magnesium element is, in this case, provided by several saline species: heptahydrate magnesium sulphate ($MgSO_4$) and magnesium bicarbonate ($Mg(HCO_3)_2$). This is the case also for calcium, provided in the form of nitrate ($Ca(NO_3)_2$) and in the form of bicarbonate ($Ca(HCO_3)_2$). Sodium is provided in the form of chloride (NaCl) and bicarbonate ($NaHCO_3$) and the potassium in the form of bicarbonate ($KHCO_3$). The tap water of Uccle needs to be slightly acidified to achieve the desired results, and bicarbonate salts, that provide some acidity, have here been preferred to hydroxides.

Once the "monosaline" solutions are prepared, the volume of each of these solutions that needs to be collected to reconstitute a litre of Evian water is calculated, as shown in the second column of table 3. Then these volumes are multiplied by 90 and combined into a single solution, concentrated 90 times, which will be injected in the circuit, as detailed in the third column of table 3.

TABLE 3

| Concentrated "monosaline" solution | Volume to collect for 1 L of Evian water | Volume (L): 90x concentrated solution |
|---|---|---|
| 1 | 0.003105 | 0.279487 |
| 2 | 0.006463 | 0.581709 |
| 3 | 0.000152 | 0.013694 |
| 4 | 0.000013 | 0.001152 |
| 5 | 0.000037 | 0.003338 |
| 6 | 0.000014 | 0.001303 |
| 7 | 0.000257 | 0.023092 |

As small quantity of $CO_2$ is also added to bring the pH of the remineralised water to 7.2 (approximately 0.0011 mol $CO_2$ per litre).

Obviously, the concentrated solution is added by microvolumes to the demineralised water. The solution being here concentrated 90 times, it has to be diluted by a factor of 90 to reconstitute Evian-type water. For example, 1 mL can be injected for each 89 mL of demineralised water circulating in the circuit. For increased efficiency, it is preferable to add 0.1 mL for every 8.9 mL of demineralised water circulating in the circuit, and even smaller volumes at a faster frequency, the frequency being the number of times an injection occurs per unit of volume of demineralised water to be remineralised. The frequency must be adapted to the capacity of the mixer, and optimised to obtain, at the output, water with a substantially constant mineral concentration.

It is also possible to process the Uccle tap water to obtain water similar to the water sold under the registered trademark Gerolsteiner.

The composition of Gerolsteiner water is compared with that of the tap water of Uccle in table 4.

TABLE 4

| Mineral element | Uccle tap water (ppm) | Gerolsteiner (ppm) |
| --- | --- | --- |
| $Ca^{2+}$ | 6.6 | 348 |
| $Mg^{2+}$ | 5.2 | 108 |
| $Na^+$ | 25.9 | 118 |
| $K^+$ | 3.1 | 10.8 |
| $HCO_3^-$ | 175.3 | 1816 |
| $SO_4^{2-}$ | 65.8 | 38.7 |
| $Cl^-$ | 18.9 | 39.7 |
| $NO_3^-$ | 12.0 | 5.1 |
| Total dissolved matter | 400 | 2488 |
| pH | 7.98 | 5.9 |

The same concentrated "monosaline" solutions as those described in table 2 were prepared.

By weight, Gerolsteiner water contains a lot more mineral elements than Evian water, in particular calcium, magnesium and bicarbonate. The volume of the "monosaline" solutions 1 and 2 to be added to reconstitute a litre of Gerolsteiner water is therefore significant, which must be taken into account for the remineralisation sequence. It is thus proposed to prepare a solution that is concentrated 18 times in mineral elements, as described in table 5. The injection of the solution concentrated in mineral elements can here be performed sequentially with two successive injections.

TABLE 5

| Concentrated "monosaline" solution | Volume (L): Gerolsteiner | Volume (L): 18x concentrated Gerolsteiner |
| --- | --- | --- |
| 1 | 0.014010 | 0.252177 |
| 2 | 0.029596 | 0.532724 |
| 3 | 0.006742 | 0.121360 |
| 4 | 0.000138 | 0.002489 |
| 5 | 0.000327 | 0.005890 |
| 6 | 0.000019 | 0.000350 |
| 7 | 0.000983 | 0.017688 |

A quantity of CO2 is also added to bring the pH to 5.9 (approximately 0.13 mol CO2 per litre).

It would however be possible to provide less calcium and magnesium with the injection of a concentrated mineral solution, and to compensate by running the water over a filter (cartridge, column) filled with dolomite and of which the composition enables to achieve the desired ion concentration. It is also possible to run the partially mineralised water on an ion-exchange resin in order to provide Mg or HCO3-bicarbonate. It is also possible to add a second microfeeding device enabling to inject a synthetic powder containing magnesium and/or calcium.

The choice of the process depends on several parameters, in particular the desired composition, the cost, the capacity of the system, etc.

The steps of the method having been described, an example of the system enabling its implementation is now presented.

Figure 2:
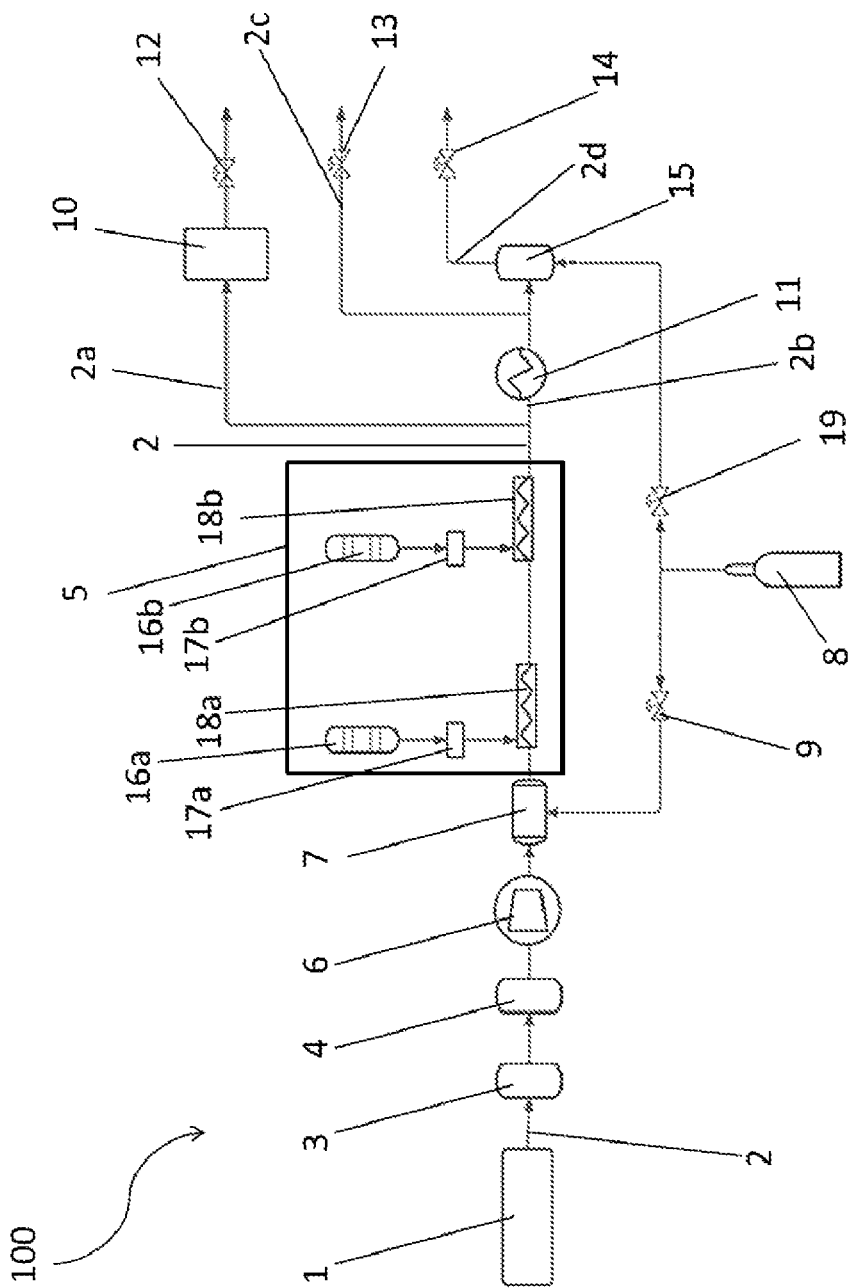
FIG. 2 is a schematic view of the appliance according to the invention.

With reference to FIG. 2, the appliance 100 comprises a connection port 1 to connect the input of the circuit 2 to the water mains. The circuit 2 passes through a cartridge 3 of granulated activated carbon, a reverse osmosis unit 4 and a remineralisation unit 5. A pump 6 and a carbon dioxide diffuser 7, connected to a cylinder of carbon dioxide 8 by a valve 9 are here inserted between the demineralisation unit and the remineralisation unit 5. At the output of the remineralisation unit, the circuit 2 splits into two sub-circuits 2a and 2b. The sub-circuit 2a passes through a heating unit 10 before reaching the outlet valve 12 of hot mineral water. The sub-circuit 2b passes through a cooling unit 11 before splitting again into two sub-circuits 2c and 2d. The sub-circuit 2c leads to the outlet valve 13 of cold water and the circuit 2d passes through the gasification unit 15, connected to the carbon dioxide cylinder 8 by a valve 19, before reaching the outlet valve 14 of carbonated cold water.

In the remineralisation unit 5, the circuit passes through a first static mixer 18a, at the input of which is connected a first fluidic microfeeding device 17a, itself connected to a reservoir 16a containing a first concentrated mineral solution. The circuit then passes through a second static mixer 18b, at the input of which is connected a second fluidic microfeeding device 17b, itself connected to a reservoir 16b containing a second concentrated mineral solution. The fluidic microfeeding device dispenses micro-volumes of the concentrated solution, depending on the flow rate of the water passing through it. The frequency at which the concentrated solution is dispensed and the dispensed volume are predetermined based on the circulation flow rate of the water that is to be remineralised.

Figure 3:
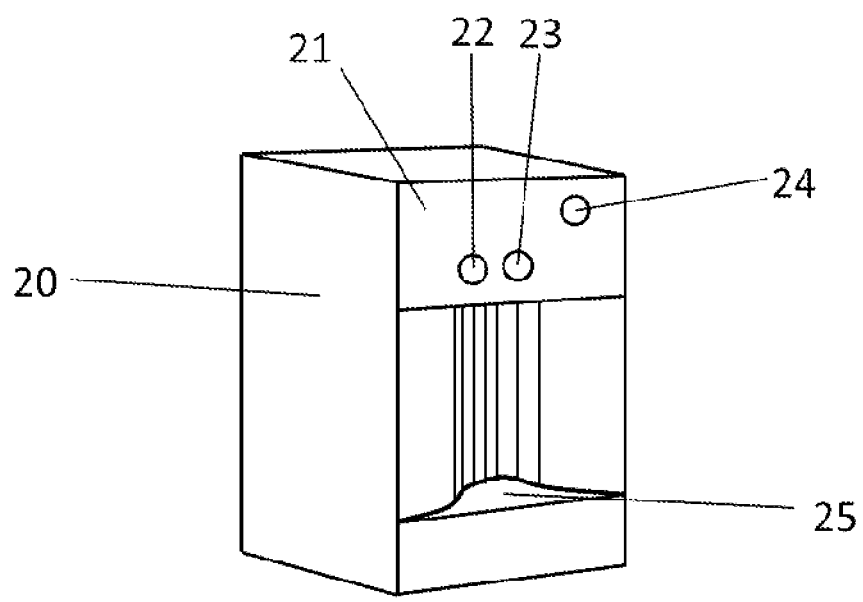
FIG. 3 is a perspective view of the appliance of FIG. 2.

With reference to FIG. 3, all the elements of the appliance are contained in a casing 20, featuring at its surface a connection port 1 (not shown), preferably at the rear of the casing, and a control panel 21, on the front of the casing, whereon are arranged a control button 22 for cooled or cold still water, a control button 23 for cold sparkling water, and a control button 24 for hot water. The front of the casing comprises a reinforcement forming a platform 25.

The appliance described above is an example of an appliance enabling the implementation of the method according to the invention for the production of water resembling the water sold under the trademark Evian from tap water of Uccle, the content of which is described in table 1. The steps I, J and K described above enabled to determine the composition and the concentration of the mother solution to pour into the reservoirs 16a and/or 16b.

A user or a consumer places a glass on the platform 25 of the appliance and initiates the production of water by pressing on one of the buttons 22 to 24, depending on their selection. The connection port 1, in this case a solenoid valve, opens to let tap water into the circuit 2.

The tap water first runs through the cartridge 3 of granulated activated carbon where it is purified by the removal of residual chlorine and other pollutants such as lead. A micron filter (not shown) is associated with this cartridge in order to eliminate all the particles potentially suspended in the tap water.

The water thus purified then passes through the unit 4 comprising one or several reverse osmosis cartridges, enabling the water to be rid of 99.5% of its minerals. The pump 6, placed downstream from the demineralisation unit 4, causes the water to flow and generates the pressure difference required for the reverse osmosis cartridges to function.

The demineralised water then flows through a carbon dioxide diffuser 7. The pH has to be slightly reduced prior to remineralisation, and the valve 9 connecting the diffuser 7 to the cylinder of carbon dioxide 8 is opened to enable the injection, continuously during production, of a specific flow rate of CO2, which, once dissolved, forms a portion of the required bicarbonate. The lowering of the pH enables here not only to achieve the desired pH value, but also to facilitate the dissolution of salts downstream from the injection of the CO2.

The demineralised water then enters the remineralisation unit 5. The first fluidic microfeeding device 17a, in this case a microfeeding pump, connected to the reservoir 16a containing the concentrated mineral solution described in table 1, is actuated as soon as a stream of water appears in the circuit, i.e. as soon as the inlet valve 1 opens. The microfeeding pump thus injects in the circuit 2 a flow/stream of the concentrated mineral solution contained in the reservoir 16a, either continuously, or in the form of micro-volumes dispensed at regular intervals. The microfeeding pump enables to manage flow rates ranging from microliters to nano-litres per second with a great degree of accuracy. The concentrated solution is mixed with the demineralised water at the level of the static mixer 18a, in this case a helical insert, which creates sufficient turbulence in the circuit 2 to homogenise the remineralised water, without causing the salts to precipitate.

After remineralisation, depending on the initial choice of the consumer, the water is sent to one of the outlet valves 12, 13 or 14.

If the user has pressed on button 22 to obtain cold still water, valve 13 is opened. The stream of water passes in the sub-circuit 2b and through an aluminium thermoelectric module enabling the cooling of the water to between 5° C. and 10° C. The cooled water then follows the sub-circuit 2c before exiting through the valve 13.

If the user has pressed on button 23, valve 14 is opened. As described above, the water is first cooled and then passes through a carbonator 15 wherein high-pressure gaseous carbon dioxide is injected into it. The flow of carbon dioxide is controlled by the valve 19 and is injected, either continuously or by pulses at regular intervals. The carbon dioxide dissolves in the cooled mineral water before leaving the sub-circuit 2d through valve 14.

If the user has pressed on button 24, valve 12 is opened. The remineralised water follows the sub-circuit 2a, passing through an electric heating module, where it reaches a temperature of between 80° C. and 95° C., before leaving the sub-circuit 2a through valve 12.

The outputs corresponding to the valves 12, 13 and 14 are preferably pipes that are either joined to form a single opening or juxtaposed, on top of the platform 25. Their opening is arranged vertically downwards so that the produced water falls into the glass placed by the consumer on the platform.

The production being immediate, pressure on one of the command buttons simultaneously causes the opening of the inlet valve 1 and of one of the outlet valves 12, 13 or 14.

A fourth outlet valve can also be considered, for the supply of lukewarm water, i.e. at ambient temperature. In this case, the remineralised water passes directly from the remineralisation unit to the outlet valve of lukewarm water.

It is also possible to consider that the cooling and heating units operate continuously, so that hot or cold water is instantly available.

For power saving purposes, it is also possible to consider that these units only operate upon request. In this case, a short delay can be programmed between the moment the user presses the button of their choice and the moment the water production starts, in order for the heating unit or cooling unit to reach the desired temperature.

Figure 4:
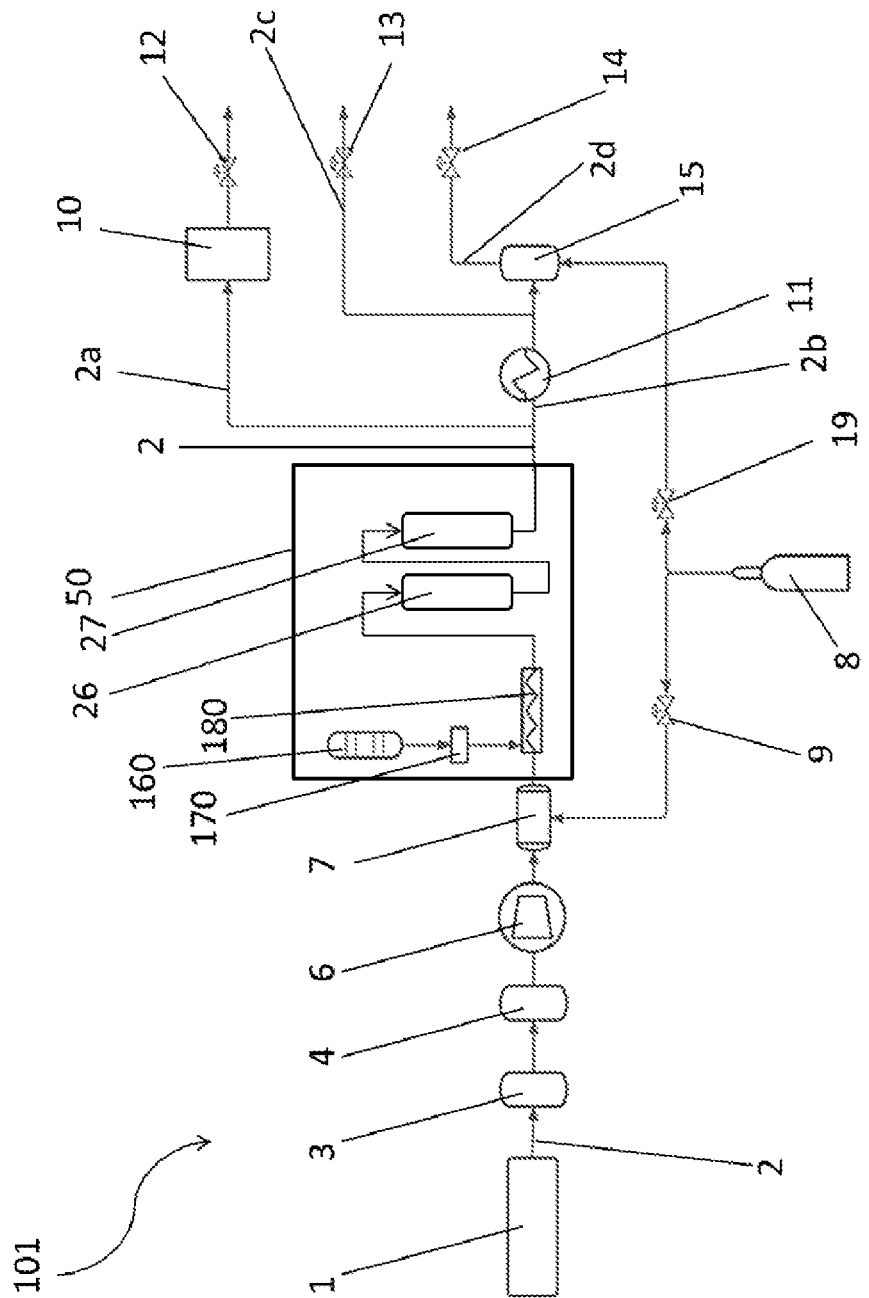
FIG. 4 is a schematic view of another appliance according to the invention.

With reference to FIG. 4, an appliance 101 can comprise a remineralisation unit 50 that is slightly different from that described for the appliance 100. The circuit 2 here passes through a static mixer 180, at the input of which is connected a fluidic microfeeding device 170, itself connected to a reservoir 160 containing a concentrated mineral solution.

The concentrated mineral solution does not, in this instance, provide the totality of the elements. The circuit then passes through a salt column 26, which can for example be constituted of dolomite. Magnesium, calcium and bicarbonate ions dissolve due to the passage of a stream of water, which then reaches an ion-exchange resin 27. The latter can, for example, enable the exchange of sodium ions for calcium, if the required calcium concentration is particularly high. It can also enable the exchange of chlorides for carbonates, as necessary.

The fluidic microfeeding devices 17a, 17b and 170 described with reference to FIGS. 2 and 4 are here microfeeding pumps connected to reservoirs 16a, 16b and 160 containing concentrated mineral solutions. These pumps can be replaced, at least partially, by systems, or cartridges, for the microfeeding of powders.

The different elements of the appliance are preferably arranged to minimise the overall volume of the circuit and to avoid dead spaces. Indeed, these dead spaces are conducive to the development of algae or bacteria, which is not desirable.

A purge function can also be provided, in order to "clean" the system after an extended period of non-use, or after the replacement of certain components of the appliance.

Indeed, the activated carbon cartridges and the reverse osmosis cartridges have to be changed regularly. Similarly, the reservoirs of solutions concentrated in mineral elements must be regularly filled.

The different elements of the appliance can be replaced by any other element or system serving the same purpose and achieving the same result.

The demineralisation step can, for example, also be achieved with an ion-exchange resin cartridge. An ion-exchange resin, generally with zeolites and polymers featuring ion groups on their chains, enable to substitute a type of ion, for example sodium cations, for another type of ion, for example calcium cations. Depending on the resin or the mixture of resin used, one or several types of ion can be substituted, thus enabling selective demineralisation.

Remineralisation is now described with a single concentrated mineral solution. However, it may also happen, in certain cases, that it is impossible, for reasons of saturation for example, to dissolve in a sufficiently concentrated manner, all the elements that are to be added. In this case, the mineral elements to be added are separated into two or more concentrated solutions, having the same composition or different compositions, and/or fine synthetic powders and/or aragonite. These two concentrated solutions and/or powders are then placed in the reservoirs 16a and 16b and injected in series using the fluidic microfeeding devices 17a and 17b, each injection being followed by a phase of mixing in the static mixers 18a and 18b.

Alternatively, if a single concentrated solution is required, the second reservoir can also be filled with this solution and used when the first reservoir is empty, thereby doubling the capacity of the appliance in terms of the concentrated solution.

The reservoirs to be filled are now described. It is also possible to consider providing the concentrated solution and/or powders in the form of "disposable" cylinders or capsules, i.e. that are attached directly to the fluidic microfeeding valves, and that can be discarded once empty.

The cooling unit is not limited to an aluminium thermoelectric module. Any other technique enabling the cooling of water circulating in the sub-circuit 2b can also be envisaged.

The carbonator is here described downstream from the cooling unit, but it could also be integrated into this unit.

The heating unit is also not limited to the form described herein.

A certain number of components of the system are advantageously connected to an electronic monitoring unit. For example, this is the case with all of the inlet and outlet valves, as well as the valves connected to the cylinder of carbon dioxide and the fluidic microfeeding valves, the pump 6 and the cooling 11 and heating 10 units. The electronic unit can thus enables to manage the flow rates in the different circuits and sub-circuits, the heating or cooling temperatures, and the injection volumes and frequency of concentrated solutions injected into the circuit.

If the gasification of the water is not required, it is possible to simplify the circuit, by removing the portion of the circuit connected to the carbon dioxide cylinder.

The appliance according to the invention can be constructed in a standard form comprising all the functions. Depending on the composition of the tap water of the commune wherein the appliance is installed and of the required mineral water, it can be programmed so that only some of its functions are used.

The invention claimed is:

1. A method for the instant production of a clear mineral water, with a predefined content of mineral elements including calcium and magnesium, from tap water, having a known inadequate content of mineral elements and a known pH, and comprising impurities, the water flowing continuously during the production and having a flow rate, said method comprising the following steps:
   eliminating the impurities of the tap water to obtain purified water;
   modulating the mineral addition of the purified water by:
      comparing said predefined content and tap water content of mineral elements in order to determine which minerals are present in excessive quantities and need to be eliminated, and which minerals are lacking and need to be added;
      at least partially demineralising the purified water by removal of the minerals to be eliminated;
      calculating the necessary amount of mineral elements to be added to the at least partially demineralized water to obtain the predefined content,
      based on this calculation and on the maximum solubility of each of said mineral elements in water, preparing at least one concentrated solution be diluted according to a defined dilution factor in the purified water, said concentrated solution comprising calcium and magnesium ions and its preparation comprising dissolving at least one salt of the list consisting of calcium hydroxide, magnesium hydroxide, calcium carbonate and magnesium carbonate,
      remineralising the water by injection and instantaneous dissolution of a volume of the at least one concentrated solution at a frequency adapted to the defined dilution factor and the flow rate and optionally complementing the remineralization by passing the water on a mineral column and/or an ion-exchange resin to readjust the mineral content to said predefined content;
   collecting the remineralised water; and
   stopping the production of mineral water.

2. The method according to claim 1, wherein the pH of the remineralised water is adjusted.

3. The method according to claim 1, wherein the pH of the demineralised water is adjusted prior to remineralisation.

4. The method according to claim 1, comprising at least one of the following steps:
   injecting carbon dioxide into the demineralised water to adjust its pH;
   injecting carbon dioxide into the remineralised water to carbonate the water;
   cooling the remineralised water; and
   heating the remineralised water.

* * * * *